(12) United States Patent
Leiden et al.

(10) Patent No.: US 9,186,838 B2
(45) Date of Patent: Nov. 17, 2015

(54) APPARATUS AND METHOD FOR COATING PIPES OR PIPE SECTIONS

(75) Inventors: Leif Leiden, Porvoo (FI); Jouni Purmonen, Porvoo (FI); Sven Sjoberg, Vasa (FI)

(73) Assignees: OY KWH PIPE AB, Vaasa (FI); BOREALIS AH, Vienna (AT)

( * ) Notice: Subject to any disclaimer, the term of this patent is extended or adjusted under 35 U.S.C. 154(b) by 481 days.

(21) Appl. No.: 13/496,770

(22) PCT Filed: Sep. 16, 2010

(86) PCT No.: PCT/FI2010/050714
§ 371 (c)(1),
(2), (4) Date: May 25, 2012

(87) PCT Pub. No.: WO2011/033176
PCT Pub. Date: Mar. 24, 2011

(65) Prior Publication Data
US 2012/0231168 A1   Sep. 13, 2012

(30) Foreign Application Priority Data

Sep. 17, 2009   (EP) .................................... 09170529

(51) Int. Cl.
*B05D 3/12* (2006.01)
*B05C 11/02* (2006.01)
(Continued)

(52) U.S. Cl.
CPC ................. *B29C 47/021* (2013.01); *B23K 9/18* (2013.01); *B23K 31/027* (2013.01); *B29C 47/028* (2013.01); *B29C 47/0806* (2013.01); *B29C 47/0866* (2013.01); *B29C 47/126* (2013.01); *B29C 47/92* (2013.01); *F16L 13/0272* (2013.01);
(Continued)

(58) Field of Classification Search
CPC ..... B29C 47/023; F16L 58/02; F16L 58/1072
USPC .................. 118/108, 110, 111; 427/359, 365, 427/428.14
See application file for complete search history.

(56) References Cited

U.S. PATENT DOCUMENTS

2003/0021899 A1 *  1/2003  Buecher ......................... 427/359
2008/0280126 A1 * 11/2008  Lenz et al. ................. 428/319.3

FOREIGN PATENT DOCUMENTS

EP          1 985 909 A1    10/2008
EP          1985909  A1 *  10/2008
(Continued)

OTHER PUBLICATIONS

International Search Report for PCT/FI2010/050714, dated Jan. 25, 2011.
(Continued)

*Primary Examiner* — Alexander Weddle
(74) *Attorney, Agent, or Firm* — Sughrue Mion, PLLC

(57) ABSTRACT

The invention relates to an apparatus and method for coating a pipe or a section of a pipe with a polymer layer. The apparatus comprises an applicator for applying polymer melt on the surface of a pipe or pipe section, a roller for pressing the polymer applied by the applicator towards the pipe or pipe section, and means for circumferentially moving the applicator and the roller around the periphery of the pipe or pipe section. According to the invention the apparatus further comprises a drive for rotating the roller as the roller is moving around the periphery of a pipe or pipe section. By means of the invention, higher quality coatings can be applied to field joints of steel pipes, for example.

21 Claims, 2 Drawing Sheets

(51) Int. Cl.
- *B29C 47/02* (2006.01)
- *B23K 9/18* (2006.01)
- *B23K 31/02* (2006.01)
- *F16L 13/02* (2006.01)
- *B29C 47/08* (2006.01)
- *B29C 47/12* (2006.01)
- *B29C 47/92* (2006.01)
- *F16L 58/10* (2006.01)
- *F16L 58/18* (2006.01)
- B05D 1/00 (2006.01)
- B05D 3/02 (2006.01)
- B29C 35/04 (2006.01)
- B29C 47/00 (2006.01)
- B29C 47/06 (2006.01)
- B29C 35/08 (2006.01)
- B29K 23/00 (2006.01)
- B29K 105/00 (2006.01)
- B29L 23/00 (2006.01)
- B29L 31/24 (2006.01)

(52) U.S. Cl.
CPC ............... *F16L 58/10* (2013.01); *F16L 58/181* (2013.01); *B05D 1/002* (2013.01); *B05D 3/0254* (2013.01); *B05D 3/0281* (2013.01); *B05D 3/12* (2013.01); *B05D 2202/00* (2013.01); *B05D 2254/02* (2013.01); *B23K 2201/10* (2013.01); *B23K 2201/34* (2013.01); *B29C 35/045* (2013.01); *B29C 47/0021* (2013.01); *B29C 47/0057* (2013.01); *B29C 47/065* (2013.01); *B29C 47/067* (2013.01); *B29C 2035/0811* (2013.01); *B29C 2035/0822* (2013.01); *B29C 2947/926* (2013.01); *B29C 2947/9258* (2013.01); *B29C 2947/92904* (2013.01); *B29K 2023/06* (2013.01); *B29K 2023/12* (2013.01); *B29K 2105/256* (2013.01); *B29L 2023/225* (2013.01); *B29L 2031/24* (2013.01)

(56) References Cited

FOREIGN PATENT DOCUMENTS

| | | |
|---|---|---|
| WO | 2007/101818 A1 | 9/2007 |
| WO | 2007/143559 A1 | 12/2007 |
| WO | 2008/071773 A2 | 6/2008 |

OTHER PUBLICATIONS

European Search Report for corresponding EP09170529, dated Mar. 30, 2010.

\* cited by examiner

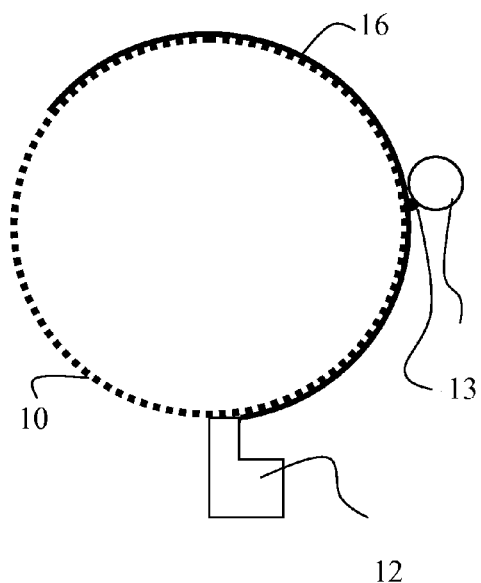
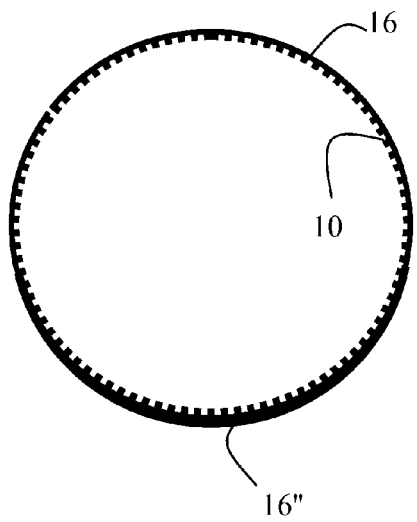
Fig. 1A (prior art)　　　　　Fig. 1B (prior art)
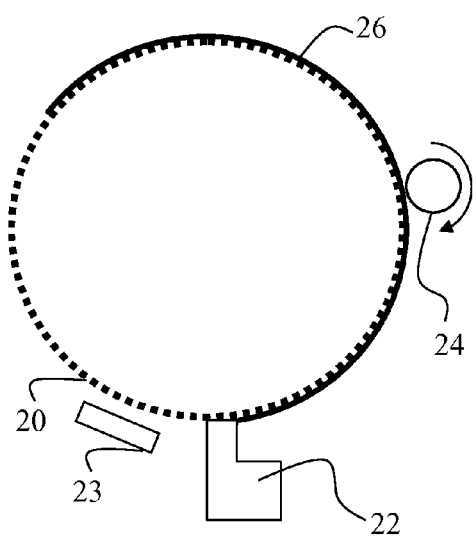
Fig. 2

APPARATUS AND METHOD FOR COATING PIPES OR PIPE SECTIONS

CROSS REFERENCE TO RELATED APPLICATIONS

This application is a National Stage International Application No. PCT/FI2010/050714 filed Sep. 16, 2010, claiming priority based on European Patent Application No. 09170529.3 Sep. 17, 2009 the contents of all of which are incorporated herein by reference in their entirety.

BACKGROUND OF THE INVENTION

1. Field of the Invention

The present invention concerns an apparatus for coating a pipe or a pipe section. The apparatus of the present kind comprises means for applying a layer of at least one polymer material on the surface of the pipe or pipe section at least along a part of the periphery thereof.

The invention also concerns a corresponding method for coating a pipe or pipe section.

2. Description of Related Art

Steel pipes coated with layers of polymers, such as polyethylene or polypropylene, have been used in oil and gas pipelines for a long time. These kinds of pipes are mechanically strong and have good corrosion resistance along the coated part of the pipe. They are generally welded together using the SAW technique (Submerged Arc Welding) to form a pipeline. To facilitate weld-joining of the pipes at the construction site, end portions of the pipe are usually left without coating at the factory. In practice, the pipes are often coated entirely and in a later stage the polymers are stripped or brushed off at the ends of the pipe. This is called cut-back area and the length is defined through the project specification, normally 150 mm on both pipe ends.

Field-welded pipe joints, i.e. girth welds formed at the construction sites, are sensitive to corrosion. For this reason, a coating layer has to be spread upon the girth weld and on the adjacent, uncoated portions of the pipes so as to completely cover the welded joint and to shield it from moisture and water in the ambience. Thus, the applied polymer layer overlaps with a factory coatings of the pipes joined.

Field-joints coatings are conventionally most typically produced by injection moulding or surface fused tape techniques. Also a number of other techniques such as epoxy-coating, PUR-coating, and coating by vulcanized tapes or shrinkable sleeves have been utilized.

WO 2008/132279, which discloses the features of the preambles of the independent claims, discloses another method and apparatus for coating field-welded joints by applying polymer material in the form of a melt film or sheet on the surface of the pipe or pipe section from a moving die or nozzle. The melt polymer film or sheet is applied on the pipe from a die which is mounted on a carriage, which can be moved along the periphery of the pipe or pipe section. For smoothening and flattening of the polymer layer deposited on the surface and for improving the adherence of the layer to the pipe or pipe section there are provided levelling means such as a roller. The roller applies a force generally perpendicular to the polymer material layer. The surface of the roller is adjustable in the direction of the central axis to fit the surface profile of the pipe or pipe section at the part which is to be coated. The roller may also be mounted on the same movable carriage as the polymer deposition means of the apparatus, e.g. an extrusion nozzle or flat die.

WO 01/32316 discloses another pipe coating apparatus for coating girth welds of pipelines, which is equipped with spray coating means.

A perfectly coated and installed pipeline should be protected all over its length with equal quality coatings, including factory coating and field-joint coatings. Using most of the commercial coating solutions today this cannot be achieved. Some systems (e.g. injection moulding and machine taping) give relatively good protection but due to their technical solutions they are not suitable to be used afield and/or cannot be used for a wide register of different sizes of pipes.

When coating field-joints using the abovementioned melt-film technique, it is essential to apply a sufficient amount of polymer and to carefully follow the rules of welding plastic pipes, i.e. time, temperature and pressure. To avoid sagging of the polymer film, heavy pressure is applied thereon by the roller. However, this easily reduces the thickness of the film on the weld-seam area in an undesired way. Another problem is that the roller stats to glide against the pipe and pushes away the polymer coating, thus reducing the quality of the coating. These effects are illustrated in FIGS. 1A and 1B. FIG. 1A shows a coating arrangement according to WO 2008/132279. The pipe is denoted with numeral 10. Polymer is applied onto the pipe from application die 12 and levelled using a roller 13. Thus, a polymer layer 16 is formed. However, the molten polymer builds up in front of the roller, see build-up 16', resulting in uneven and inconsistent polymer layer. Another problem associated with prior art is the sagging of polymer between 4 o'clock and 8 o'click directions, i.e. a thicker polymer layer at the lower part of the pipe, see sagging 16" in FIG. 1B.

Thus, conventional methods and apparatuses are not optimal at least for applying relatively thick layers of polymer, in particular polyolefin (PO) or modified polyolefin.

SUMMARY OF INVENTION

It is an aim of the invention to achieve a coating apparatus which solves at least some of the problems discussed above. In particular, it is an aim to achieve a melt film field joint coating apparatus which is capable of producing higher quality coatings.

Further aims include achieving an apparatus which suits well for field conditions and for producing thicker polymeric coating layers.

It is also an aim to achieve a novel coating method suitable for coating field joints.

The invention is based on the idea of providing an apparatus comprising
- an applicator for applying polymer melt on the surface of a pipe or pipe section,
- a roller for pressing the polymer applied by the applicator towards the pipe or pipe section,
- means for circumferentially moving the applicator and the roller around the periphery of the pipe or pipe section, and
- a drive for actively rotating the roller around its own central axis at a predefined speed as the roller is circumferentially moving around the periphery of a pipe or pipe section.

The polymer is preferably applied from a flat die, whose die gap may be variable or invariable. Also special designs of the die are possible. The roller is also typically flat, but variable roller geometries may be utilized too, as will be described later in more detail.

In particular the apparatus may comprise a movable carriage, which is capable of travelling around the periphery of a pipe or pipe section, whereby the applicator and the roller—and typically also the drive of the roller—are mounted on the movable carriage.

Preferably, the rotating speed of the roller may be adjustable according to the travelling speed of the moveable carriage.

The applicator may be a die, such as a flat die capable of feeding a film of polymer melt between the roller and the pipe.

By using a roller equipped with an active drive the problem related to gliding and resulting deterioration of quality can be avoided. Practice has shown that a simple freely running roller cannot produce coatings of the desired quality in particular with high coat thicknesses. High thickness necessitates the application of more material from the die onto the welding area. However, having a high amount of molten polymer in front of the roller and at the same time applying the required pressure by the roller results in slipping or gliding of the roller and a fair coating cannot be achieved. The inventors have found that the quality requirements can be fulfilled and sufficient layer thicknesses on the weld-seam can be ensured by providing a drive for the roller. By suitably adjusting the rotation speed of the roller with that of the movable carriage, both the desired layer thickness and the desired quality can be achieved.

The present method for coating a pipe or a section of a pipe with a polymer layer generally comprises, in combination, the steps of
    providing a pipe or a pipe section having an outer surface defining the periphery of the pipe or pipe section,
    applying on the outer surface of the pipe or pipe section a layer of at least one polymer material in the melt state with a nozzle or die, which is mounted on a carriage capable of travelling along the periphery of the pipe or pipe section,
    moving the carriage along at least a part of the periphery for applying the polymer material onto at least a part of the pipe or pipe section, and
    while moving the carriage, pressing the applied polymer material towards the pipe or pipe section with a roller which is actively rotated for preventing or reducing gliding of the roller on the polymer.

More specifically, the invention is defined in the independent claims.

Preferably, the rotation speed of the roller is adjusted to depend on the moving speed of the carriage. In particular, the circumferential speed of the roller may correspond to the circumferential speed of the carriage at the outer surface of the applied polymer layer. In other words, according to one embodiment, the mutual velocity of the surface of the polymer layer and the surface of the roller at their interface is minimized, resulting in essentially no gliding or slipping.

In addition to the ability to produce thicker polymeric coating layers or high quality, the invention provides a plurality of other advantages. As the roller is actively driven, the coating can be started in an automated fashion by applying the polymer being from the die into the nip formed by the pipe and roller. As no manual manoeuvres are needed in this stage, the risk of accidents is minimized and the quality of coating is ensured in the coating starting region. In addition, as stretching of the film from the die is not necessary, the desired coating thickness is easier to achieve throughout the whole circumference of the pipe.

The actively driven roller aids in extending the possible operation parameters of the application apparatus. In particular, the interdependence of the polymer application speed and apparatus rotation speed can be relieved. By means of the present invention, one can both apply the polymer as a thinner layer by rotating the carriage faster and stretching the extruded film (positive draw-down) and also apply the polymer as a thicker layer by rotation the carriage slower and accumulating the polymer film (negative draw-down). In the case of negative draw-down, with no drive the roller would stop rotating and start gliding against the polymer smoothening it out like a planing machine. However, by means of the drive, the roller climbs over the thicker layer mangling it against the pipe filling the field joint to the same thickness as the factory coating. As the roller can "climb" no build up in front of the roller takes place. Zero draw-down speed corresponds to a situation where no stretching or accumulation of polymer takes place but the coating machine is moving at the same speed as polymer is extruded from the die.

By being able to produce thicker coatings than before, one can also reduce the number of rotations required to produce a tight seal. Thus, by means of the invention it is possible to reduce the time required for field joint coating.

The shape and properties of the roller, as well as the distance between the roller and the pipe can be designed in a case by case manner such that a sufficient amount of material will always be applied onto the weld-seam. A broad overlap with the factory coating is not needed as welding of the applied layer to a beveled end of the factory coating is enough to secure the tightness of the field joint coating. The roller typically extends at the region of the factory coating, thereby contributing to achieving a smooth field joint coating—factory coating seam. The absence of a thicker overlap region improves pipe handling at e.g. spool-bases and during horizontal drilling.

The movable carriage can be fastened to the pipe by a suitable support structure and can thereafter be automatically run around the pipe fastened to the pipe body.

BRIEF DESCRIPTION OF DRAWINGS

FIG. 1A (prior art) shows a coating arrangement according to closest prior art.

FIG. 1B (prior art) shows a pipe provided with a thick coating layer which has sagged.

FIG. 2 shows schematically the coating arrangement according to one embodiment of the invention.

DETAILED DESCRIPTION OF PREFERRED EMBODIMENTS

Figure 3:
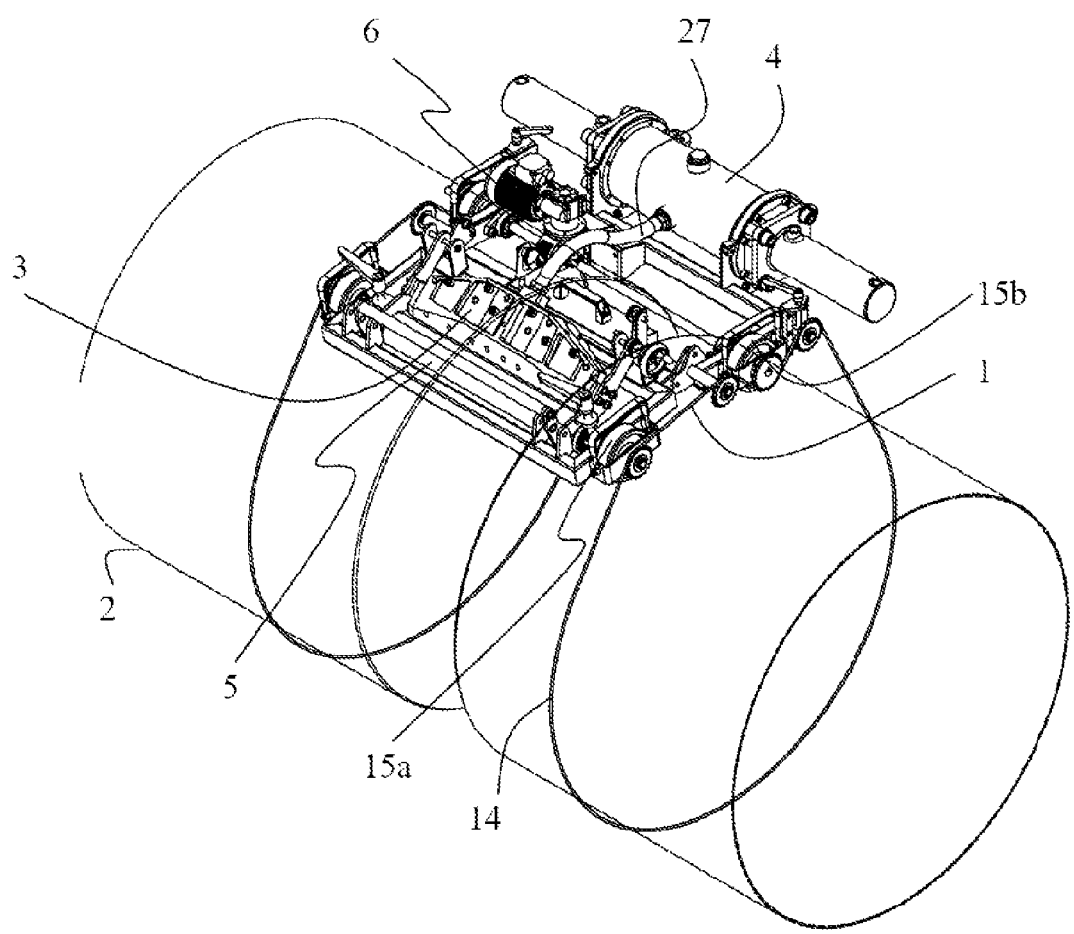
FIG. 3 shows a detailed perspective view of the coating apparatus according to one embodiment.

According to the invention, melt polymer film applied on the surface of the pipe or pipe section and levelled after application by an actively driven roller rotatable around its own central axis (herein referred to as "rotation") and around the pipe (herein referred to as "circumferential movement"). The terms "active driving" or "active rotation" mean that the roller is not freely rotating around its own axis solely due to friction and viscosity forces at the interface of the polymer layer and the roller, but other energy in used to rotate the roller at a desired speed. The term "circumferential movement" includes also spiral-like movement. By levelling the polymer material, it is possible to ensure good adhesion of the polymer to the pipe and to adjust the thickness of the layer so that it corresponds to a pre-selected, i.e. desired or specified, thickness of the coating. In addition, by levelling any air pockets between the polymer layer and the coated surface can be removed and a tight and hermetic coating is achieved. According to one embodiment, the drive is an electric motor. The motor may be assembled directly on the longitudinal axis of the roller or it may be assembled on a different axis, whereby suitable power transmission means, such as a belt, a chain, wheels or a gearing, are provided between the motor and the roller.

According to a preferred embodiment, the carriage is moved along the periphery of the pipe or pipe section such that the distance of the roller from the pipe surface essentially corresponds to a pre-selected thickness of the polymer coating. It is preferred to have the carriage travel at least 180 degrees and in particular at least 360 degrees along the periphery of the pipe or pipe section to provide a polymer layer covering half or all the outer surface along the periphery.

Typically, the carriage is rotated around the pipe at a plane perpendicular to the longitudinal axis of the pipe for producing a local single-layer of multiple-layer coating. However, one embodiment allows for several consecutive wrapping layers, e.g. by moving the carriage along a spiral-shaped path along the periphery of the pipe or pipe section to provide a polymer layer. In such a case, it is particularly advantageous to have each following layer partially overlap the proceeding layer whereby a hermetic and tight sealing layer can be produced. For achieving a spiral-shape path, either the carriage or the pipe can be axially transferred during coating.

The velocity of the carriage can be freely regulated. Depending on the thickness of the film and the consumption of the polymer material it is typically in the range of about 0.01 to 20 m/min, for example about 0.1 to 5 m/min, in particular about 0.3 to 2 m/min, this also being the typical rotation speed of the roller surface.

According to a preferred embodiment, the movable carriage can be guided for movement around the periphery of the pipe or pipe section with strapping and guiding means. As concerns this embodiment and also alternative embodiments relating to the structure and functioning of the carriage, we refer to WO 2008/132279, the relevant parts of which are incorporated herein by reference.

The rotatable roller is fastened to the movable carriage such that the surface of the roller is capable of following the upper surface of the pipe or pipe section in such a way that it smoothens the polymer layer against the surface tightly.

The thickness of the polymer layer—and the adherence of the layer to the pipe or pipe section—is also influenced by the roller. Thus, the roller typically applies a force generally perpendicular to the polymer material.

According to the preferred embodiment already mentioned above, the roller is mounted on the same movable carriage as the extrusion nozzle/flat die. However, if desired, the roller can be mounted on a second movable carriage which follows the first movable carriage.

According to one embodiment, a film is extruded from the flat die onto the roller and transferred from the roller onto the outer surface of the pipe or pipe section. In this case, the roller operates as a part of the applicator means and additionally smoothens and levels the film while transferring it against the surface of the pipe or pipe section. Alternatively, the film may be extruded directly to the pipe or pipe section, e.g. by non-contact coating (such as curtain coating). In a still alternative embodiment, the film is extruded directly to the nip formed between the roller and the pipe or pipe section. By feeding the polymer directly to the surface of the roller or to the nip, air gaps under the coating can be effectively prevented.

The roller applies a pressure to the polymer sufficient to deliver polymer to all irregularities on the pipe, including the potential bevellings of the factory coatings of the pipe. Because of the heating, a weld joint is formed between the factory coating and the field-applied coating. In practice, the sufficiency of polymer mass and pressure applied thereon can be guaranteed by ensuring that the field-applied coating has a thickness of at least equal to the thickness of the factory coating, preferably slightly overlapping with it.

The polymer film can have any desired dimensions, but typically it has a thickness in the range of 0.01 to 10 mm, preferably about 0.1 to 7 mm, in particular about 0.5 to 5 mm. The active rotation of the roller has been found to be of particular importance at negative draw-down speeds, as both the amount of polymer in front of the roller and its tendency to slip are increased. The breadth of the film is about 1 to 1500 mm, preferably about 5 to 1250 mm, in particular about 10 to 1000 mm. The length is advantageously about ¼ of the periphery to about 20 times the periphery, although this is no limit. In general, for example for covering a field joint/weld about 1 to 10 succeeding layers of partly overlapping polymer films suffices.

Another possibility to coat field-joints, in particular where the factory coating is really thick, 10-100 mm or even more, or to fill holes or irregularities in the pipe surface is to run a sufficient amount of material from the die and then to press (mangle) it against the pipe body with the roller. Thus, continuous application of polymer is not necessary. This can be called application using negative draw-down technique.

The coating may comprise a film of only one polymer material, but it can also be formed of a multilayer structure, where there are films of two or more polymer materials.

At least one of the films can be a foamed polymer. Typically, the surface or skin layer of the coating is composed of a solid polymer layer.

The roller can be made in different ways. According to one embodiment, the roller is uniform in thickness, i.e. non-profiled. According to an alternative embodiment, the surface of the roller is profiled in the direction of its central axis to fit the surface profile of the pipe or pipe section at the part which is to be coated. For that purpose the roller may be formed by an integral roller/cylinder, which can be profiled. That is, the surface of the roller is unitary, but shaped to have a special design over the whole length. According to one embodiment, the roller is formed by several cylindrical sections of the same or even somewhat different diameters. Thus, the roller can be made of segments whereby it can be assembled depending on the project (width, shape of weld, bevel angle, overlap need/specification). Also by making the roller out of segments different hardness on different places can be specified. It is also possible to use two or three rollers with different hardnesses for certain purposes.

According to one embodiment, the roller comprises an elastic surface, which can be achieved by using silicon or rubbery materials. Thus, the surface is adapted to the adhesive properties of the melt polymer to provide for easy release. Generally, the hardness of the elastic surface is about Shore A 10 to 30. However, it has been found that by means of the active drive of the roller, also hard roller surfaces (e.g. polyamide) can be used. In particular, active drive combined with negative draw-down speed has shown to loosen the requirements of the surface properties of the roller.

According to an embodiment, the method according to the present invention is used for producing a polymer layer having a predetermined breadth, whereby the material is applied on the surface of the pipe or pipe section using a flat die having a width of the slit gap essentially corresponding to the predetermined breadth of the layer.

As already indicated above, the polymer material is applied in the form of a melt film. The polymer applicator is typically a die, such as an "extrusion nozzle" or "extrusion die" which is capable of forming a melt polymer material into a polymer film having a breadth essentially corresponding to the pre-selected breadth of the coating layer. Any die, such as a flat die, capable of producing a melt film or sheet of the polymer material used, can be applied and is included in the definition of "extrusion die" and "extrusion nozzle". I.e. said term is to be construed to stand for any die or nozzle capable of forming a film from the feed of a polymer melt. Naturally, multilayer film dies or nozzles can also be used.

As known in the art, the cross-section of the flow channel at the entrance of a flat die is typically a circle or a rectangle with a small aspect ratio. In the die, this initial cross-section is gradually transformed to a large aspect ratio rectangle required for sheet extrusion. The channel geometry in a flat die is designed so as to provide for uniform velocity at the exit of the die. The die is connected to at least one source of melt polymer material. This source is typically selected from the group of extruders, heated screw mixers and storage containers. For producing a multilayered film, it is possible to connect the die to two or more sources of polymer material.

Thus, the amount of polymer to be extruded may be controlled in various ways. The die gap can be adjustable for example by suitable screws, by exchangeable intermediate parts (lip parts) or the whole die may be replaceable by a die with another geometry.

One typical source of melt polymer is a conventional extruder, where the starting material comprising polymer pellets is heated before feeding with a feed screw to the extrusion tool. It is possible to connect the die to the extruder to provide for direct feed of melt polymer to the die. The extruder can be replaced with a heated screw mixer which can be filled with polymer pellets and where the polymer can be molten. Such a screw mixer can be mounted on the carriage.

As concerns alternative embodiments relating to the structure and functioning of the die or the extruder, we refer to WO 2008/132279, the relevant parts of which are incorporated herein by reference.

In a preferred embodiment, the polymer material is applied on a surface comprising at least partially an uncoated part of a polymer coated metal pipe, such as a steel pipe. The pipe section may comprise the girth weld between two adjacent pipes, which are welded to each other. The girth weld and the adjacent parts of the uncoated steel pipe, including the abutting ends of the polymer coating, are coated for tightly sealing off the girth weld against air, moisture and water.

Other applications of the present method include repair of polymer coatings, coating of generally any polymer pipes and also of materials different from polymers or metals.

In all above applications, the pipe or pipe section is coated with at least one thermoplastic polymer, for example one selected from the group consisting of polyolefins, in particular polyethylene and polypropylene, and modified polyolefins. One class of particularly interesting polymers is formed by stand alone polyolefins, disclosed in more detail in EP 1859926, the relevant contents of which are herewith incorporated by reference. Such polyolefins comprise adhesion promoting groups, in particular polar groups, e.g. groups selected from the group of acrylates, such as methylacrylates, methylmethacrylates, propylacrylates, butylacrylates, carboxylic acids, such as maleic acid, and amines. Still other polymers, in particular those with adhesion promoting (polar) groups, and processes for preparation thereof for the purposes of the invention, are disclosed in WO 2008/132279, the relevant parts of which are also incorporated herein by reference. Generally, all polymer compounds disclosed in that document can be used in combination with the present coating apparatus.

The methods as discussed above, are preferably carried out by first heating the outer surface of the pipe or pipe section. By heating the surface, better adherence of the film to the outer surface can be reached. The temperature is selected depending on the properties of the polymer and on the heating time. Generally, it is not necessary to heat up the surface to the melting temperature of the polymer. Preferably the pipe surface is heated at a temperature in the range of 80 to 300° C. before coating. The heating can be carried out manually. One preferred embodiment comprises heating the surface with a heating means mounted on the carriage. This heating means is preferably mounted before the roller and the die in the progression direction of the carriage.

Before the surface is coated, it is possible to modify the surface of the pipe or pipe section by contacting it with a priming agent for improving adherence between the polymer layer and the surface. Naturally, the surface is preferably cleaned before any other treatment. Cleaning can be carried out for instance by shot or grit blasting or by sand blasting.

The pipe diameters can vary generally in the range from about 100 mm to 3500 mm. Typically in the particularly preferred embodiment, where the invention is used for coating field joints between polyolefin coated pipes, the diameters of the pipes are in the range of about 100 to 1500 mm.

It is to be noted that although usually utilized for pipes having a circular cross section, the invention can be utilized for applying coating around the circumferences of pipes of other shapes too.

It should still be pointed out that according to one embodiment, the relative motion between the carriage and the pipe can also be achieved by rotating the pipe which maintaining the carriage in stationary position. However, in such embodiment too, the roller is actively rotated for achieving the benefits of the invention. Such an embodiment can be applied for example indoors, in factories.

FIG. 2 shows the main components of an exemplary coating apparatus. The pipe 20 is heated with a heater 23. The heater 23 may be an inductive heater. Polymer is applied from an applicator 22. An actively driven roller 24 is rotated with the applicator 22 to level the polymer material applied so as to an even polymer layer 26 overlapping with the factory coating (not shown) of the pipe 20. In addition, the apparatus contains support structure (not shown) onto which the abovementioned parts are mounted and means for attaching the apparatus to the pipe and for moving around the pipe.

FIG. 3 shows a more detailed view of the coating apparatus. In FIG. 3, the following reference numerals are used:
1 frame
2 pipe
3 nozzle assembly
4 feed cylinder
5 levelling roll
6 motor
14 chain
15a, 15b wheels
27 pressure hose As shown in FIG. 3, the present moveable coating device comprises a frame 1 supported upon two sets of wheels 15 for travelling along the surface of a pipe 2. The carriage 1, 15a, 15b is strapped onto the pipe 2 with the aid of at least one chain 14—in the embodiment according to the drawing, there are two chains—arranged in a loop around the pipe and having a length greater than circumstance of the pipe 2. The traction chain 14 engages chain wheels on the frame, at least some of which are rigidly mounted on the same axis (shaft) as the wheels 15 and kept in place with retaining rings. A chain tightener is provided for keeping the tension of the chain suitable for keeping the carriage 1, 15a, 15b pressed against the surface. In the moving direction, the carriage 1, 15a, 15b comprises a heating means (not shown) in the form of a radiation heater, such as an IR radiator or inductive heating unit. Next to the heating means there is a flat die 3, which is fed by polymer melt from a cylinder 4, which can be filled with the calculated amount of polymer melt needed for covering a predetermined surface of a pipe. The cylinder 4 and the die 3 are connected with a pressure hose 27. The cylinder is provided with an emptying means, e.g. a piston, which pushes melt polymer out of the cylinder 4 and through the hose 27 to the die 3. Close to the front wheels 15*a*, there is a levelling roll 5, which transfers a polymer film extruded from the die 3 onto the surface of the pipe 2. The roll 5 is equipped with a drive (not shown) stressed with a spring (not shown) so that it presses against the surface of the pipe. For a more detailed description on the basic structure of the apparatus, we refer to WO 2008/132279, the relevant parts of which are incorporated herein by reference.

The above embodiments, examples and attached figures are non-limiting and given in illustrative purposes only. The scope of the invention is to be interpreted in the full scope of the following claims, taking equivalents into account.

The invention claimed is:

1. An apparatus for coating a pipe or a section of a pipe with a polymer layer, comprising:
    an applicator for applying polymer melt on the surface of a pipe or a pipe section;
    a roller for pressing the polymer applied by the applicator towards the pipe or the pipe section, the roller having a central axis;
    means for circumferentially moving the applicator and the roller around a periphery of the pipe or the pipe section at a circumferential speed,; and
    a drive for rotating the roller actively around a central axis of the roller as the roller moves around the periphery of a pipe or the pipe section,
    wherein the drive for rotating the roller is configured to actively rotate the roller at a rotating speed that is essentially equal to the circumferential speed.

2. The apparatus according to claim 1, wherein the means for circumferentially moving the applicator and the roller comprises a carriage, the roller and the drive of the roller being mounted on the carriage.

3. The apparatus according to claim 1, wherein the drive is an electric motor.

4. The apparatus according to claim 1, wherein the surface of the roller comprises at least one elastic material.

5. The apparatus according to claim 1, wherein the surface of the roller comprises at least a hard materiale.

6. The apparatus according to claim 1, wherein the roller is profiled along its central axis.

7. The apparatus according to claim 1, wherein the applicator is arranged to form a film made of polymer melt and to feed the film to a nip formed by the roller and the surface of the pipe section or the pipe.

8. The apparatus according to claim 1, wherein the applicator and means for circumferentially moving the applicator are adjustable to rotate the roller at a speed to provide a negative draw-down of the polymer.

9. The apparatus according to claim 1, wherein the movable carriage comprises a support means to fasten the carriage to the pipe, allowing the carriage to automatically run move around the periphery of the pipe or the pipe section.

10. The apparatus according to claim 9, wherein the support means comprises at least one chain releasably attached to the pipe or the pipe section.

11. The apparatus according to claim 1, wherein the drive is further configured to variably drive the rotating speed of the roller.

12. A method of coating a pipe or a section of a pipe with a polymer layer, the method comprising:
    providing a pipe or a pipe section having an outer surface defining the periphery of the pipe or the pipe section;
    applying on the outer surface of the pipe or the pipe section a layer of at least one polymer material in a melted state with an applicator, the applicator being mounted on a carriage capable of travelling along a periphery of the pipe or the pipe section;
    moving the carriage along at least a part of the periphery of the pipe or the pipe section at a circumferential speed;
    pressing the applied polymer material towards the pipe or the pipe section with a roller having a central axis while moving the carriage; and
    rotating the roller around its own the central axis of the roller during the pressing,
    wherein step of rotating the roller actively rotates the roller at a rotating speed that is essentially equal to the circumferential speed.

13. The method according to claim 12, wherein the coating is applied on a girth weld between two steel pipes.

14. The method according to claim 12, wherein said polymer is a polyolefin.

15. The method according to claim 12, wherein the rotation of the roller is achieved using a drive which is mounted on the movable carriage.

16. The method according to claim 12, wherein the polymer layer is given a desired surface profile in the axial direction of the pipe or the pipe section by using a roller which is profiled along the central axis of the roller to match the surface profile of the pipe or the pipe section.

17. The method according to claim 12, comprising feeding a polymer film from the applicator between the roller and the surface of the pipe or the pipe section.

18. The method according to claim 12, wherein the carriage speed is controlled to allow the polymer material from the applicator to be applied by at negative draw-down.

19. The method according to claim 12, wherein the carriage is fastened to the pipe or the pipe section using a support means during moving of the carriage and application and pressing of the polymer.

20. The method according to claim 12, wherein said polymer is polyethylene or polypropylene or a modified polyolefin.

21. An apparatus for coating a pipe or a section of a pipe with a polymer layer, comprising:
    an applicator configured to apply polymer melt on the surface of a pipe or a pipe section;
    a roller configured to press the polymer applied by the applicator towards the pipe or the pipe section, the roller having a central axis;
    a carriage configured to circumferentially move the applicator and the roller around a periphery of the pipe or the pipe section at a circumferential speed; and
    a drive configured to rotate the roller actively around a central axis of the roller as the roller moves around the periphery of a pipe or the pipe section,
    wherein the drive is set to actively rotate the roller at a rotating speed substantially equal to the circumferential speed.

* * * * *

UNITED STATES PATENT AND TRADEMARK OFFICE
CERTIFICATE OF CORRECTION

| | | |
|---|---|---|
| PATENT NO. | : 9,186,838 B2 | Page 1 of 1 |
| APPLICATION NO. | : 13/496770 | |
| DATED | : November 17, 2015 | |
| INVENTOR(S) | : Leif Leiden et al. | |

It is certified that error appears in the above-identified patent and that said Letters Patent is hereby corrected as shown below:

ON THE TITLE PAGE

At column 1, please correct the second Assignee's name:

(73) Assignees: OY KWH PIPE AB, Vaasa (FI);

BOREALIS AG, VIENNA (AT)

Signed and Sealed this
Twenty-ninth Day of March, 2016

Michelle K. Lee
*Director of the United States Patent and Trademark Office*